United States Patent
Bain et al.

(10) Patent No.: US 8,307,037 B2
(45) Date of Patent: Nov. 6, 2012

(54) INTER VEHICLE COMMUNICATION SYSTEM

(75) Inventors: David Bain, Arlington, VA (US); John Ray Paseur, McLean, VA (US)

(73) Assignee: BUMP Network, Inc., La Jolla, CA (US)

(*) Notice: Subject to any disclaimer, the term of this patent is extended or adjusted under 35 U.S.C. 154(b) by 0 days.

(21) Appl. No.: 11/265,091

(22) Filed: Nov. 3, 2005

(65) Prior Publication Data

US 2006/0059229 A1 Mar. 16, 2006

Related U.S. Application Data

(63) Continuation-in-part of application No. 09/757,651, filed on Jan. 11, 2001, now abandoned.

(60) Provisional application No. 60/175,258, filed on Jan. 10, 2000.

(51) Int. Cl.
 G06F 15/16 (2006.01)
 G06Q 99/00 (2006.01)

(52) U.S. Cl. ........................................ 709/206; 705/319

(58) Field of Classification Search .......................... None
 See application file for complete search history.

(56) References Cited

U.S. PATENT DOCUMENTS

| | | | | |
|---|---|---|---|---|
| 5,086,394 A * | 2/1992 | Shapira | ........................ | 705/319 |
| 5,351,302 A | 9/1994 | Leighton et al. | | |
| 5,668,880 A | 9/1997 | Alajajian | | |
| 5,734,337 A | 3/1998 | Kupersmit | | |
| 5,950,200 A * | 9/1999 | Sudai et al. | ........................ | 1/1 |
| 6,052,122 A * | 4/2000 | Sutcliffe et al. | ................ | 715/751 |
| 6,061,681 A | 5/2000 | Collins | | |
| 6,269,372 B1 * | 7/2001 | Wertheim | ........................ | 707/10 |
| 6,549,768 B1 * | 4/2003 | Fraccaroli | ................ | 455/456.3 |
| 6,594,502 B1 * | 7/2003 | Koester | ........................ | 455/414.1 |
| 7,050,990 B1 | 5/2006 | Chu et al. | | |
| 7,502,827 B2 | 3/2009 | Arfaa | | |
| 2001/0034768 A1 | 10/2001 | Bain et al. | | |
| 2002/0026478 A1 | 2/2002 | Rodgers et al. | | |
| 2002/0065828 A1 | 5/2002 | Godspeed | | |
| 2002/0104026 A1 | 8/2002 | Barra et al. | | |
| 2002/0161657 A1 * | 10/2002 | Kojac et al. | ........................ | 705/26 |
| 2003/0016799 A1 | 1/2003 | Stern et al. | | |
| 2003/0028494 A1 | 2/2003 | King et al. | | |
| 2003/0095688 A1 | 5/2003 | Kirmuss | | |
| 2003/0126036 A1 | 7/2003 | Mascavage et al. | | |
| 2004/0068433 A1 | 4/2004 | Chatterjee et al. | | |
| 2004/0236702 A1 | 11/2004 | Fink et al. | | |

(Continued)

OTHER PUBLICATIONS

U.S. Appl. No. 11/359,118, filed Feb. 21, 2006.

(Continued)

*Primary Examiner* — Krista Zele
*Assistant Examiner* — Azizul Choudhury
(74) *Attorney, Agent, or Firm* — Cooley LLP

(57) ABSTRACT

A method and network for transmitting a message from a sender to a recipient wherein the sender has no previous knowledge of the recipient's identity. A method is provided for registering a user with a web-enabled database service by providing correlating data on the user's identity and vehicle license plate number and/or other vehicle identifying information. A sender observing a vehicle can send a message to the recipient by logging onto the service and sending a message including the license plate number of the vehicle or other vehicle identifying information. The service will forward the message to the recipient by looking up the vehicle information, discerning the most appropriate communications method(s), and causing the message to be transmitted to the recipient or stored for later delivery.

29 Claims, 6 Drawing Sheets

U.S. PATENT DOCUMENTS

| | | |
|---|---|---|
| 2006/0001524 A1 | 1/2006 | Thorn |
| 2006/0036457 A1* | 2/2006 | McNamara ........................ 705/1 |
| 2006/0053201 A1 | 3/2006 | Fahmy |
| 2006/0059229 A1 | 3/2006 | Bain et al. |

OTHER PUBLICATIONS

U.S. Appl. No. 12/784,421, filed May 20, 2010.
U.S. Appl. No. 09/757,651, filed Jan. 11, 2001.
U.S. Appl. No. 11/359,118 Non-Final Rejection mailed Feb. 24, 2009.
U.S. Appl. No. 11/359,118 Final Rejection mailed Nov. 24, 2009.
U.S. Appl. No. 12/784,421 Non-Final Rejection mailed Dec. 8, 2010.
U.S. Appl. No. 09/757,651 Final Rejection mailed May 3, 2005.
U.S. Appl. No. 09/757,651 Non-Final Rejection mailed May 20, 2004.
Pilcher, Joseph "How's Your Pickup? L.a.'s freeway singles Club Offers a Smooth Way to Get your Love Life in Gear" People Magazine, May 27, 1985, Vo. 23, No. 21., p. 104.
U.S. Appl. No. 12/784,421 Final Rejection mailed Sep. 2, 2011.

* cited by examiner

Message Code Menu:

Driving Cautions
1. Slow Down
2. Use Your Blinker
3. Share the Road
4. Please observe a safe following distance
5. Be careful, children are at play in the neighborhood Carpool Inquiry
6. Are you interested in morning commute carpooling?
7. Are you interested in evening commute carpooling?
8. Are you interested in morning and evening commute carpooling?

Complimentary
9. Thanks for letting me in
10. Thanks for sharing the road
11. Nice Car
12. You caught my eye!

Safety/Maintenance
13. Your brake light is out
14. Your headlights are out/off
15. You're leaking oil
16. You're vehicle is exhausting smoke Miscellaneous
17. Enter/Create unique message

ROADREWARDS.COM

FIG. 6

INTER VEHICLE COMMUNICATION SYSTEM

This application is a continuation in part of U.S. application Ser. No. 09/757,651, filed on Jan. 11, 2001, now abandoned which application claims the benefit of U.S. Provisional Application No. 60/175,258, filed Jan. 10, 2000, now abandoned. Each of these applications is incorporated herein by reference

BACKGROUND OF THE INVENTION

1. Field of the Invention

The present invention relates to a system and method for connecting messages addressed sent from one vehicle (sender) intended for a second vehicle (recipient) without requiring pre-knowledge of the recipient's address information.

2. Description of the Prior Art

Computers are becoming more and more prevalent throughout our technologically advanced society. Even with drivers of passenger vehicles commuting on busier roads with more and more distractions and obstacles, the technology boom is quickly adding more and more internal distractions to the inside of vehicles. Portable telephones are currently the most visible technological distraction for drivers. Minivans are now coming equipped with televisions and video players and video games in the backseat area for the amusement of the passengers. GPS systems and mapping displays are finding their way into our vehicles. Heads-up-displays and night vision systems are beginning to enter the market place as well.

Cars and trucks are also being built now with additional outlets to run more of the external electronics that drivers and passengers are porting with them. The outlets that once were used to run radar detection units are now being used by the ever present computers. Laptops, notebooks, and hand held computers are becoming more and more prevalent as the internet becomes an important method of sending and retrieving vital information. Where individuals once made a telephone call to information to locate phone numbers, now the same individuals are downloading the telephone number off the internet along with the address, map and driving directions to the destination from free sites available on the internet.

With the methods available for one person to communicate with another at an all time high, through telephones, faxes, e-mail, chat groups, and a myriad of other sources, there should be a simple way for any individual in sight of a vehicle to transmit a message to the vehicle without having to know the identity or address of the driver.

Wertheim (U.S. Pat. No. 6,269,372) posits a system with some of these capabilities. The Wertheim "PLATEDATE" is a transaction-based system for romantic dating. In the majority, its references to prior art discuss relationships and physical attraction. Wertheim collects personal information on martial status and sexual orientation, and uses this information to make decisions about its messaging capabilities. It describes the use of a database of license plate numbers, which can be queried after the first party has paid a lookup fee. The Wertheim system then provides the personal data of the second party, and its work is complete.

The current inter vehicle communication system ("IVCS") uses a database containing, inter alia, license plate numbers. Unlike the prior art, IVCS extends the value of this database in several valuable and unique ways.

The current system proposed by the present invention utilizes a central database and service to connect one driver with another driver by a common internet medium. As in-car computers become more prevalent, inter-vehicle e-mail will provide an ideal method of connecting two drivers who were previously unknown to each other. The internet provides a common format standardization for transmitting data which is independent of the operating system, browser, and software being used by both or either of the end computers. A hand held computer operating in a non-DOS (WINDOWS™, MACINTOSH™, etc.) environment can communicate easily with a laptop running in a DOS environment, and vice versa. E-mail and the internet provide common communication standards as well as a relatively "free" transmission medium.

The Inter Vehicle Communication System (IVCS) is a database clearing house to permit users to register their personal/professional contact information, including, inter alia, telephone numbers, email addresses, SMS and instant message IDs. Such information may be hereinafter referred to as the "IVCS-ID". The IVCS registration process permits users to designate various parts of the IVCS-ID as public or private, and to associate the user's IVCS-ID with a vehicle, identified by year, make, model, color, and license plate or a IVCS decal ID number. Through this database clearinghouse any individual can send a message (via phone, IVR, email, SMS, instant messaging, etc) to the IVCS-ID of any vehicle on the road, simply by identifying the license plate that should receive the message. Registered users possessing an IVCS-ID can receive the messages sent to them via this system.

SUMMARY OF THE INVENTION

Accordingly, it is a principal object of the invention to provide an inter vehicle communication system capable of forwarding messages from one driver to another driver without requiring the first driver have prior knowledge of the second driver's identity.

It is another object of the invention to provide a system for forwarding information from a first party to a second party identified solely by the second party's license plate number, decal information or similar vehicle identifying information.

It is a further object of the invention to provide a method of operation of a clearinghouse for registering users by personal/professional contact information to allow automated transmission of messages from one driver to another driver.

Still another object of the invention is to provide a database and computer system capable of storing and retrieving IVCS-ID data on members, to correlate incoming messages addressed to a member's vehicle license plate number (or other vehicle identifying information ("VII")) and to forward the messages to the member via the appropriate personal/professional contact methods.

Yet another object of the invention is to provide an Applications Programming Interface ("API") that makes the collective IVCS-ID and VII identification and communications data of the IVCS available, for a fee, to third-party subscribers.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 6 shows preformatted message text for use in sending a message through the IVCS according to the present invention.

Similar reference characters denote corresponding features consistently throughout the attached drawings.

DETAILED DESCRIPTION OF THE PREFERRED EMBODIMENT(s)

The present invention is to a system and method for connecting an outgoing message of a first party ("sender") with a communications terminal of a second party ("recipient") who has been identified by the first party only by visual identifying parameters pertaining to the vehicle of the second party such as the vehicle license plate number, registration decal, or other identifying information.

Figure 1:
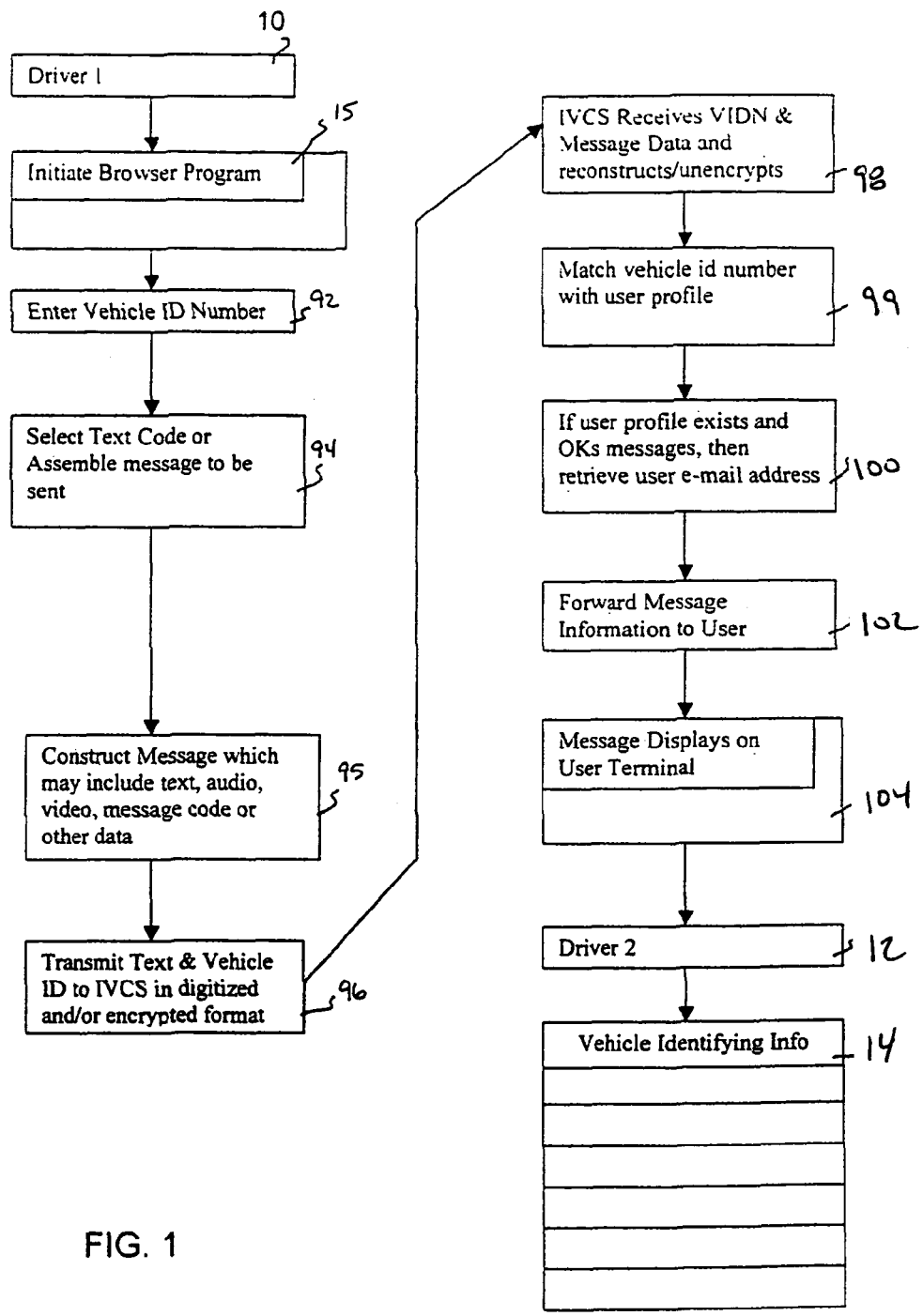
FIG. 1 is flow diagram of the transmission of a message from a first driver to a second driver.
Figure 4:
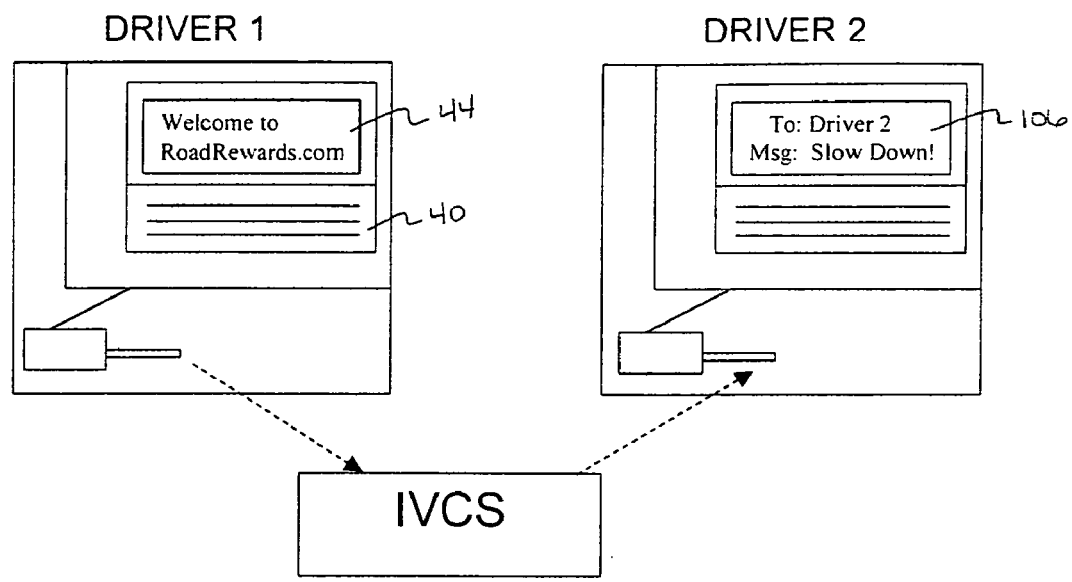
FIG. 4 is a diagrammatic view of a first vehicle browser program in communication with a second vehicle browser program through an Inter Vehicle Communication System according to the present invention.

As shown in FIGS. 1 and 4, a first driver 10 operating a vehicle 11 observes a second driver 12 operating a vehicle 14 within his visual range and wants to send a message to the second driver. The vehicle 14 has identifying information that is visually ascertainable such as the model, vehicle color, number of doors, license plate number and state. The vehicle may have additional information that is only ascertainable from up close or at certain angles, or via certain technologies, such as a rooftop identification number, vehicle identification number, taxi badge number, Bluetooth, or RFID code, etc. Additionally the vehicle may have other identifying information that is ascertainable through electronic broadcast or other methods. The information 16 is cumulatively the vehicle identifying information ("VII").

A number of reasons may occur why the first driver would want to contact the second driver. For instance, the first driver may want to tell the second driver to slow down or that his tail light is out. Currently there is no method other than to flag down the driver or to beep at the driver until the driver pulls over to see why he is being flagged down. However, it is likely that the second driver will either fail to see or hear the signals, or fearing foul play of some kind will choose to ignore the signals and speed off without receiving the information which could be important or helpful to the driver.

Currently the only way that it is possible for the first driver ("sender") to send information is if the sender recognizes the driver of the second vehicle ("recipient") and already knows how to contact the recipient, or at a minimum knows the name of the recipient and can find the recipient's address indexed by his name. The likelihood that the sender knows any driver at a random intersection or stretch of highway is extremely small. And the likelihood that the sender can track down contact information on the web, if it is available at all or up to date, in time to send a useful message, while simultaneously paying attention to driving, is even smaller.

According to the present invention, a service is provided via a combination of telecommunications and a database which allows the first driver to easily send a message by phone, over the internet, by e-mail or similar form, to the second driver without having prior knowledge of the second driver's contact information, if the second driver is registered with the inter vehicle communication system ("IVCS").

Registration

A central aspect of the current invention is the registration service. The registration satisfies at least two main goals of the service. First is the collection of correlation data on a user such as his name, address, e-mail address, license plate number, and/or other vehicle identification information. The second is to ascertain that the user wishes to receive information from any individual trying to forward the information to him.

Figure 2:
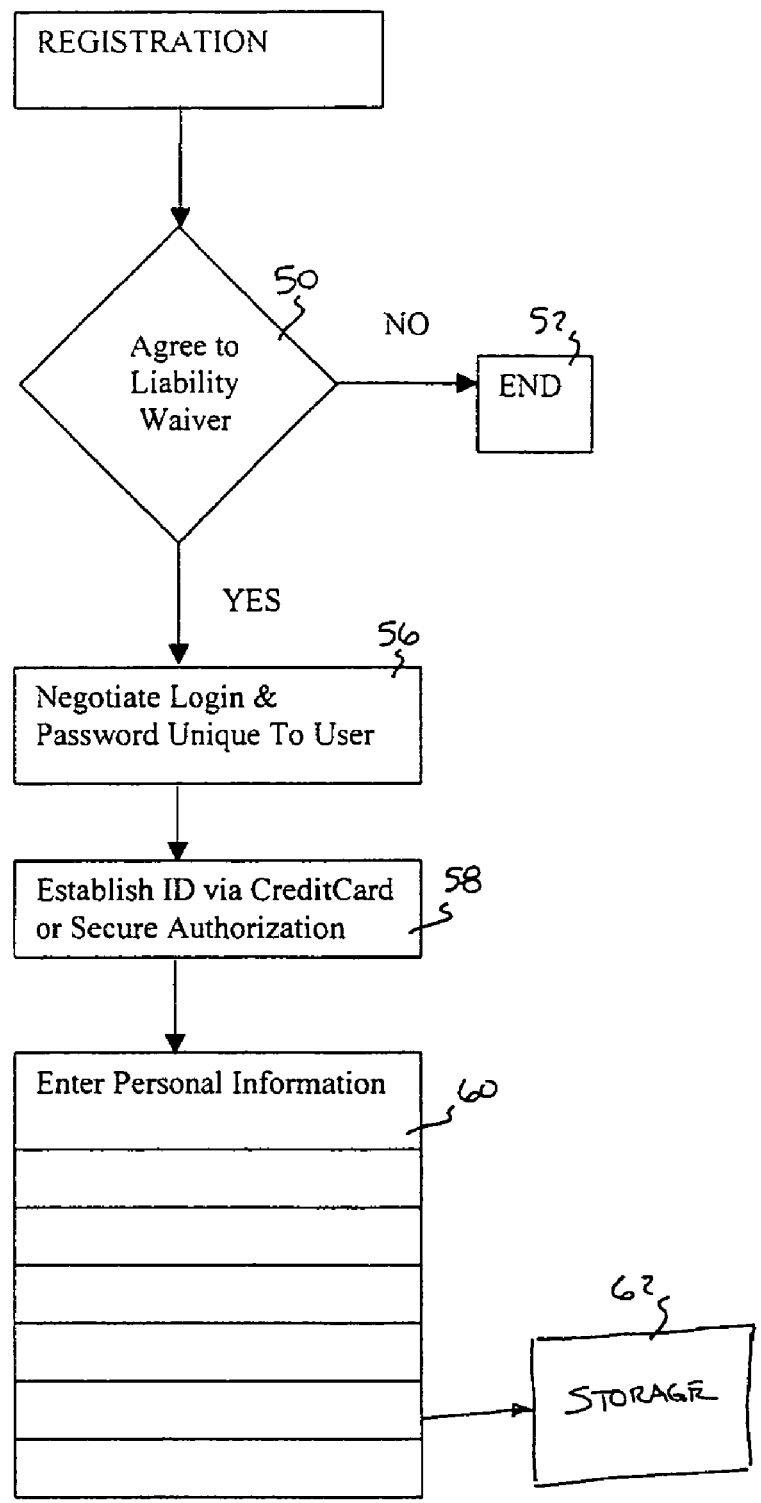
FIG. 2 is a flow diagram of the registration of information with the inter vehicle communication system.
Figure 3:
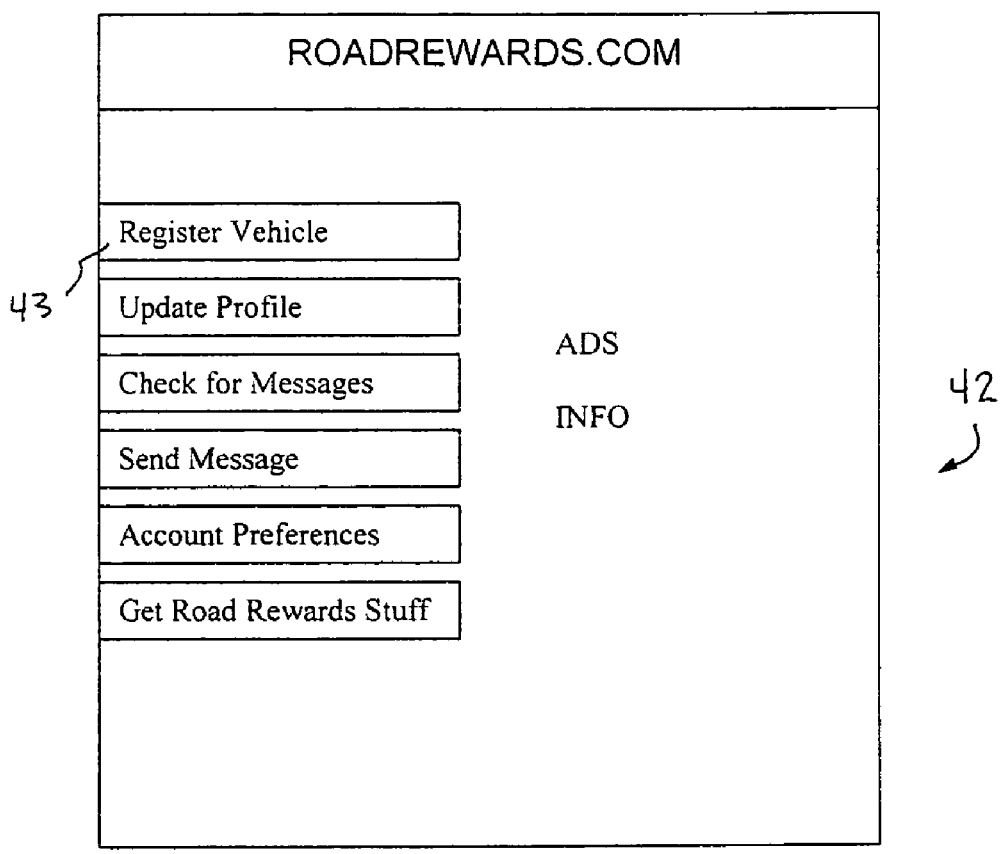
FIG. 3 is a diagram of a web page menu structure according to the present invention.

To initiate registration, as best shown in FIG. 2, a user logs onto the webpage (FIG. 3) of the Inter Vehicle Communication Services ("IVCS"). It is to be understood that the particular computer used at any time is irrelevant, so long as the computer is internet-capable and is logged onto a service provider such that it may send and receive e-mail addressed to the user. The webpage 42 (FIG. 3) is then presented on the computer monitor 44.

Once the user is logged onto the webpage 42, the user selects "register vehicle" to initiate the log on process. The "register vehicle" button 43 may be graphical, hypertext, hyperlinked, or otherwise programmed to send the user to the registration page. The registration page may be graphical or text based. FIG. 2 shows a flow diagram representing the registration steps for a preferred registration process. Once at the registration page, the user is queried 50 whether or not he agrees to a waiver of liability. This is preferred so that the IVCS does not have to control the content or transmission of information between the parties. If the user does not agree, then the webpage ends 52 the registration process and sends the user out of the registration process back to the main page 42.

If the user agrees to waive liability against the service, then the user negotiates a unique login name and password process 56 for future access and registration to the system. This process is well known to one of ordinary skill in the art and will not be described further. If the user signs onto the IVCS again, the user can be matched with his profile and rights by re-entering the id and password, or by automatic identification through the use of Instant Message ID, Caller ID, internet cookies or other methods.

After establishing the login and password, the user must be authenticated 58 both to establish the true identity of the user and to limit "false" users that could clog the database with extraneous information. Authentication of the user may take any of several forms. Most commonly, the user enters his name and address information and authenticates himself by providing a credit card number which can be verified. However, other common means are now available and will soon be implemented which could be used as well. These methods include a telecommunications verification source, an independent internet verification source, a secure authorization site, or verification by PayPal (™) or a similar service provider.

Now that the user has been given a login identification and has been authenticated, the user can proceeds to the step 60 of entering personal data about himself and his vehicle. The following data are representative only and could include more or less data identifying the user and his vehicle:

Name,
address (work and/or home),
telephone number (work, cellular, and/or home),
e-mail address,
Instant Message ID,
SMS Id,
webpage information, vehicle type and model,
vehicle color,
license plate number,
vehicular identification number ("VIN").

The information could also include other types of visual or non-visual identifying numbers available to certain segments of the population such as police enforcement, truckers, specialized licensee such as taxi drivers, etc. This information could include:

Roof top identification numbers,
electronically transmitted identification numbers,
taxi badge numbers,
other information printed on the vehicle or carried by the vehicle.

Figure 5:
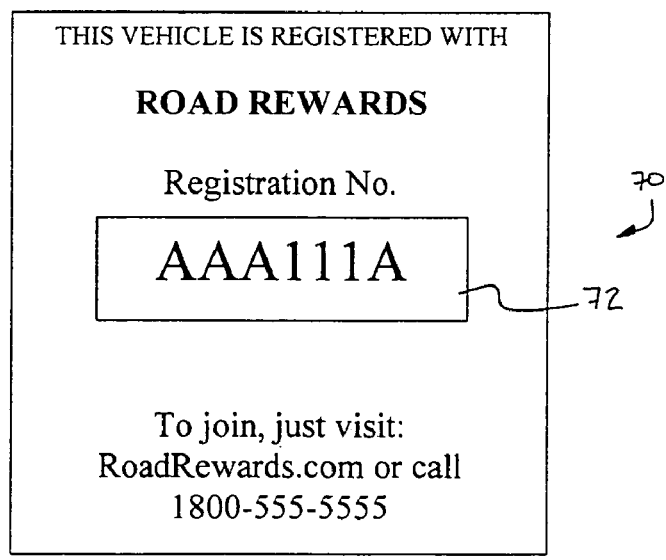
FIG. 5 is a front plan view of a vehicle decal showing registration information for a vehicle registered with an IVCS according to the present invention.
Figure 7:
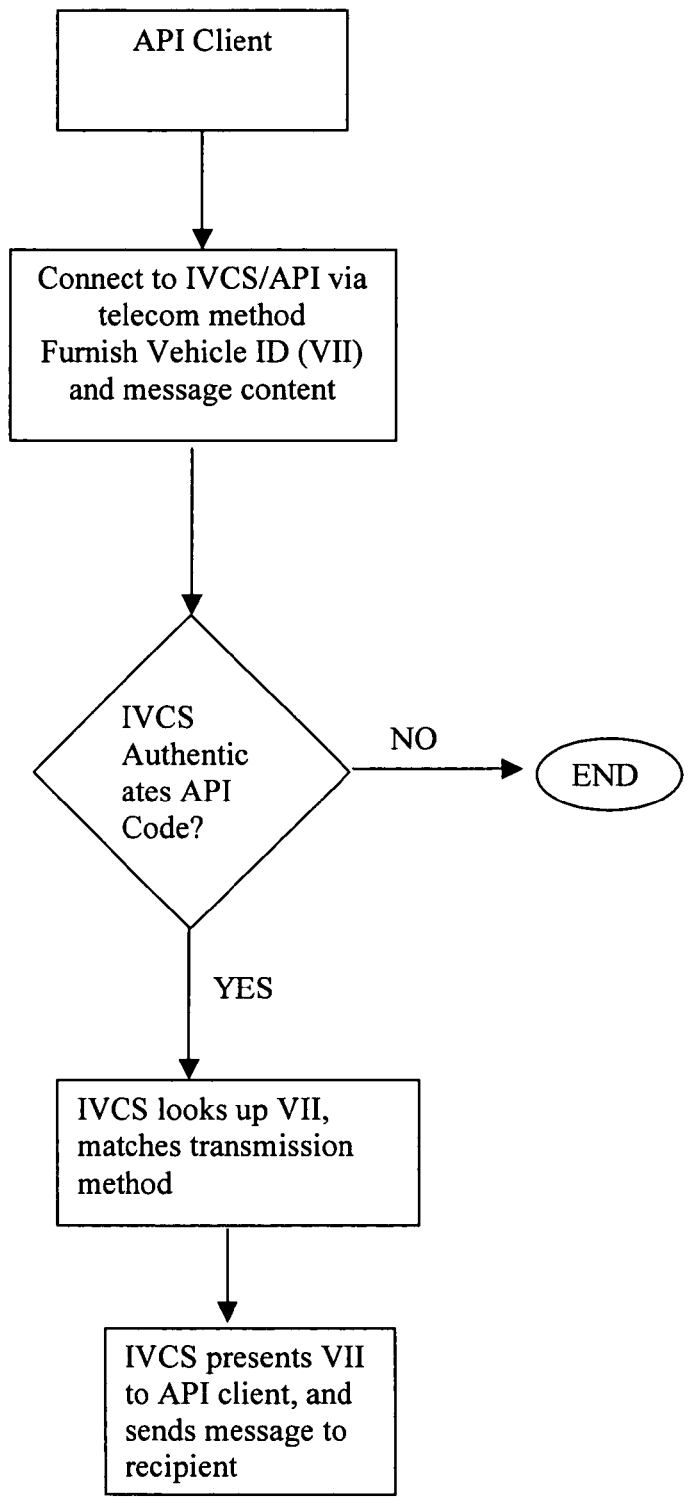
FIG. 7 is a flow diagram of the operation of the IVCS API.

In addition, the IVCS could issue identification numbers on decals (70, FIG. 5) placed in the window of the vehicle or otherwise affixed to the vehicle which identify the vehicle by a number or code 72 or mark which vehicles are members of the service. The code 72 could consist of number, letters, symbols or a combination thereof.

The IVCS then stores 62 the information into a database. The database records are linked such that a search by any one field can retrieve data linked to that field. For example, a search of the license plate 555AAA can retrieve the name of the user (e.g. "John Doe") who registered the particular license plate. Various fields may be searched such as a entering a partial license plate along with color and type of vehicle to find a likely match, or the search may be only for the unique vehicle identification number to find the name of the registrant. Or instead of recalling the registrant's name, the database could present only the e-mail address of the registrant, a proxy for the e-mail address (that is an e-mail address that forwards a message to the registrant's e-mail address) or any other data found in the database.

It is a key feature of this patent that the public or private characteristic of each field of the data base is under control of the registrant.

Operation

In operation, a SENDER 10 having access to a communications device 80 and viewing a second vehicle 14 desires to contact the driver of the second vehicle. As best shown in FIGS. 1 and 4, the SENDER initiates communication via a telephone or handheld computer 80 and accesses the interface to the IVCS service and database. After pulling his vehicle off to a safe place (not shown), the SENDER then selects "send message" 90 from the graphical or audio menu sending him into the routine shown in the flow diagram of FIG. 1.

The SENDER is then prompted 92 for the license plate number of the vehicle that he wishes to contact, including the state designator for the plate, if necessary. The SENDER is then prompted 94 for the text of the message to be sent. Alternatively, the SENDER can choose from a table 96 (FIG. 6) of form messages that can be sent. The form messages may include those shown in FIG. 6. Thus if the SENDER enters code "3", the message "Share the Road" is selected to be sent to the second vehicle 86. The message can also take the form of voice, audio, video, or other data which can be converted to a digital signal and sent to any communications terminal, though text is preferred to maintain the size of the message at a minimal byte count.

The message is then prepared 95 for transmission 97. The message includes address information identifying the intended recipient solely by the license plate number or other vehicle identifying information ("VII").

The IVCS database receives the message or encrypted message and reconstructs 98 the message, including the address information. The IVCS then separates out the address information including the license plate number or VII. The IVCS compares 99 the license plate number or VII to member profiles in its database.

If the information matches the profile of a particular member, and the member profile authorizes the transmission of the information, then the IVCS retrieves 100 the contact information of the member 12 from the database and formats a new message addressed to the registered member 12 and containing the original message information of the first party's 10 message. The message is then forwarded 102 to the second party via the designated communications methods.

The message may include a return address for the sender, so that a reply can be returned merely by hitting the "reply to" or "call back" button on the message. One skilled in the art would also recognize that the message could be sent anonymously or by a non-returnable address. Alternatively, the message could be a general broadcast sent by a police officer or other official sending a warning message to speeders or an informational message such as "road closed ahead" or other message.

One skilled in the art would appreciate that the sender 10 could also be in a stationary position such as a house or yard or somewhere else where he can observe the vehicle and utilize the system according to the present invention without departing from scope and teaching of the present invention.

Additionally, in the case where both the sender 10 and recipient 12 are registered members of the IVCS, instead of forwarding the message as a one-way communication, an "instant message" screen could be presented instead allowing for the instantaneous transmission of messages between the users on a split screen. The top screen preferably showing incoming messages and the bottom screen showing messages sent or under being typed for transmission. Preferably, voice communication between the two parties either through a web-based program or by hot linking the wireless communications systems supporting the modems of the computer browsers, the two parties can talk directly to each other. The preferred method of communication used will be dictated by the technology currently available—modem speed, encryption methods, integration of computers and telephones, and standards currently in effect.

Revenue for the project will be provided preferably in two levels. A low level service will be available free of charge to the subscriber. The fees will be provided instead through advertisers to the service and links to travel related services or other marketers as appropriate. This level might only allow a subscriber to receive only e-mail. By paying a subscription fee, the user would have access to other services such as filtering (based on key words or message codes) or voice communication, private chat or instant messaging, or other services.

It is to be understood that the present invention is not limited to the sole embodiment described above, but encompasses any and all embodiments within the scope of the following claims.

We claim:

1. A computer-implemented method for directing message communications from a sender to a recipient comprising the steps of:

a. receiving a message from the sender including message information and vehicle identifying information corresponding to a vehicle of the recipient;

b. determining the vehicle identifying information matches information included within a profile associated with the recipient;

c. receiving registration information, the registration information representing an identity of the recipient and at least a portion of the information included within the profile associated with the recipient;

d. authenticating the registration information to establish the recipient as being associated with the vehicle;

e. constructing, upon determining the profile authorizes messages to be sent to the recipient and upon authenticating the registration information, a message addressed to the recipient wherein the message addressed to the recipient includes at least a portion of the message information; and f. sending the message to the recipient in accordance with one or more communication methods specified by the recipient and included within the profile.

2. The method of claim 1, further including using Bluetooth or RFID vehicle identification to enable the sender to provide automatic messaging to vehicles in radio-proximity to the sender.

3. The method of claim 1, wherein the vehicle identifying information includes a Bluetooth transferred identification or RFID vehicle identification to enable the senders to provide automatic messaging to vehicles in radio proximity to the sender.

4. The method of claim 1 wherein the vehicle identifying information includes license plate information.

5. The method of claim 1 wherein the one or more communication methods comprise at least electronic mail and instant messaging.

6. The method of claim 1 wherein the one or more communication methods comprise at least electronic mail and SMS.

7. The method of claim 1 wherein the vehicle identifying information includes a portion of a license plate number and vehicle characteristic information.

8. The method of claim 7 wherein the vehicle characteristic information includes a vehicle color or a vehicle type.

9. A computer-implemented method for directing message communications from a sender to a recipient comprising the steps of:

establishing a database containing a plurality of records, each of the plurality of records including vehicular identification information linked to one or more electronic addresses;

receiving a message from the sender including message information and vehicle identifying information-corresponding to a vehicle of the recipient;

determining the vehicle identifying information matches at least a portion of the vehicular identification information in one of the plurality of records;

receiving registration information, the registration information representing an identity of the recipient and at least a portion of the vehicular identification information in the one of the plurality of records;

authenticating the registration information to establish the recipient as being associated with the vehicle;

constructing, upon determining the profile authorizes messages to be sent to the recipient and upon authenticating the registration information, a message addressed to at least one of the one or more electronic addresses included within the one of the plurality of records wherein the message addressed to the at least one of the one or more electronic addresses includes at least a portion of the message information; and sending the message to the at least one of the one or more electronic addresses in accordance with one or more communication methods specified by the recipient and included within the one of the plurality of records.

10. The method of claim 9 wherein the vehicle identifying information includes license plate information.

11. The method of claim 9 wherein the one or more communication methods comprise at least electronic mail and instant messaging.

12. The method of claim 9 wherein the one or more communication methods comprise at least electronic mail and SMS.

13. The method of claim 9 wherein the vehicle identifying information includes a portion of a license plate number and vehicle characteristic information.

14. The method of claim 13 wherein the vehicle characteristic information includes a vehicle color or a vehicle type.

15. A server apparatus, comprising:

a processor;

a database coupled to the processor, the database containing a plurality of records wherein each of the plurality of records includes vehicular identification information linked to one or more electronic addresses; and a memory coupled to the processor, the memory containing instructions for execution by the processor to:

receive a message from a sender including message information and vehicle identifying information-corresponding to a vehicle of a recipient;

determine the vehicle identifying information matches at least a portion of the vehicular identification information in one of the plurality of records;

receive registration information, the registration information representing an identity of the recipient and at least a portion of the vehicular identification information in the one of the plurality of records;

authenticate the registration information to establish the recipient as being associated with the vehicle;

responsively construct, to the extent previously authorized by the recipient and subsequent to authenticating the registration information, a message addressed to at least one of the one or more electronic addresses included within the one of the plurality of records; and send the message to the at least one of the one or more electronic addresses in accordance with one or more communication methods specified by the recipient and included within the one of the plurality of records wherein the message to the at least one of the one or more electronic addresses includes at least a portion of the message information.

16. The server apparatus of claim 15 wherein the vehicle identifying information includes license plate information.

17. The server apparatus of claim 15 wherein the one or more communication methods comprise at least electronic mail and instant messaging.

18. The server apparatus of claim 15 wherein the one or more communication methods comprise at least electronic mail and SMS.

19. The server apparatus of claim 15 wherein the vehicle identifying information includes a portion of a license plate number and other information relating to the vehicle.

20. The server apparatus of claim 19 wherein the vehicle characteristic information includes a vehicle color or a vehicle type.

21. A non-transitory processor-readable medium comprising instructions for causing a processor to: receive a message from a sender including message information and vehicle identifying information-corresponding to a vehicle of a recipient; determine the vehicle identifying information matches at least a portion of vehicular identification information in one of a plurality of records within a database, each of the plurality of records including vehicular identification information linked to one or more electronic addresses; receive registration information, the registration information representing an identity of the recipient and at least a portion of the vehicular identification information in the one of the plurality of records; authenticate the registration information to establish the recipient as being associated with the vehicle; responsively construct, to the extent previously authorized by the recipient and subsequent to authenticating the registration information, a message addressed to at least one of the one or more electronic addresses included within the one of the plurality of records wherein the message addressed to the at least one of the one or more electronic addresses includes at least a portion of the message information; and send the message to the at least one of the one or more electronic addresses in accordance with one or more communication methods specified by the recipient and included within the one of the plurality of records.

22. The medium of claim 21 wherein the vehicle identifying information includes license plate information.

23. The medium of claim 21 wherein the one or more communication methods comprise at least electronic mail and instant messaging.

24. The medium of claim 21 wherein the one or more communication methods comprise at least electronic mail and SMS.

25. The medium of claim 21 wherein the vehicle identifying information includes a portion of a license plate number and vehicle characteristic information.

26. The medium of claim 21 wherein the vehicle characteristic information includes a vehicle color or a vehicle type.

27. The medium of claim 21 wherein the vehicle characteristic information includes at least one of a vehicle color, a vehicle model or a number of doors.

28. The medium of claim 21 wherein the instructions further cause the processor to:

receive an indication of a waver of liability associated with the recipient prior to sending the message.

29. The medium of claim 21 wherein the sent message is one of a plurality of form messages selected by the sender.

\* \* \* \* \*